(12) United States Patent
Solar et al.

(10) Patent No.: US 10,331,956 B2
(45) Date of Patent: Jun. 25, 2019

(54) VEHICLE VISION SYSTEM WITH DETECTION ENHANCEMENT USING LIGHT CONTROL

(71) Applicant: MAGNA ELECTRONICS INC., Auburn Hills, MI (US)

(72) Inventors: Martin Solar, Erlenbach (DE); Marius Wombacher, Hösbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 207 days.

(21) Appl. No.: 15/273,752

(22) Filed: Sep. 23, 2016

(65) Prior Publication Data
US 2017/0083774 A1 Mar. 23, 2017

Related U.S. Application Data

(60) Provisional application No. 62/222,268, filed on Sep. 23, 2015.

(51) Int. Cl.
| | |
|---|---|
| *H04N 7/18* | (2006.01) |
| *G06K 9/00* | (2006.01) |
| *G06K 9/46* | (2006.01) |
| *H04N 5/225* | (2006.01) |
| *H04N 5/232* | (2006.01) |
| *G06K 9/62* | (2006.01) |
| *G06K 9/20* | (2006.01) |

(Continued)

(52) U.S. Cl.
CPC ......... *G06K 9/00798* (2013.01); *B60Q 1/085* (2013.01); *B60R 1/00* (2013.01); *G06K 9/2027* (2013.01); *G06K 9/4661* (2013.01); *G06K 9/6267* (2013.01); *G06T 11/60* (2013.01); *H04N 5/2256* (2013.01); *H04N 5/23293* (2013.01); *H04N 7/188* (2013.01); *B60R 2300/804* (2013.01)

(58) Field of Classification Search
CPC ............................ H04N 5/2256; H04N 5/272
USPC ........................................................ 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

FOREIGN PATENT DOCUMENTS

| | | | | |
|---|---|---|---|---|
| EP | 2413264 A2 | * | 2/2012 | ......... G06K 9/00798 |
| EP | 2423048 A2 | * | 2/2012 | ............ B60Q 1/085 |
| WO | WO 2017036919 A1 | * | 3/2017 | ......... G06K 9/00805 |

*Primary Examiner* — Gims S Philippe
(74) *Attorney, Agent, or Firm* — Honigman LLP

(57) ABSTRACT

A vision system of a vehicle includes a camera having a field of view exterior and forward of the vehicle. A control includes an image processor that is operable to process image data captured by the camera. The control is operable to determine lane markers ahead of the vehicle and in a path of travel of the vehicle, and predicts lane markers beyond the sensing range of the camera. Responsive to prediction of lane markers ahead of the vehicle that are outside and beyond the first sensing range of the camera, the control controls a matrix of light emitting diodes to enhance illumination at a target region that encompasses where lane markers are predicted to be. Responsive to processing of captured image data with enhanced illumination at the target region, the control is operable to determine the presence of an object at the target region.

20 Claims, 10 Drawing Sheets

(51) Int. Cl.
  *G06T 11/60* (2006.01)
  *B60R 1/00* (2006.01)
  *B60Q 1/08* (2006.01)

(56) References Cited

U.S. PATENT DOCUMENTS

| | | |
|---|---|---|
| 5,796,094 A | 8/1998 | Schofield et al. |
| 5,949,331 A | 9/1999 | Schofield et al. |
| 6,396,397 B1 | 5/2002 | Bos et al. |
| 6,587,573 B1 * | 7/2003 | Stam .................. B60Q 1/085 340/930 |
| 6,690,268 B2 | 2/2004 | Schofield et al. |
| 6,693,517 B2 | 2/2004 | McCarthy et al. |
| 7,004,606 B2 | 2/2006 | Schofield |
| 7,038,577 B2 | 5/2006 | Pawlicki et al. |
| 7,156,796 B2 | 1/2007 | Makley |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 7,972,045 B2 | 7/2011 | Schofield |
| 8,013,780 B2 | 9/2011 | Lynam |
| 9,146,898 B2 | 9/2015 | Ihlenburg et al. |
| 9,896,022 B1 * | 2/2018 | Pertsel .................. B60Q 1/085 |
| 2002/0080618 A1 | 6/2002 | Kobayashi et al. |
| 2002/0176605 A1 | 11/2002 | Stafsudd et al. |
| 2004/0016870 A1 | 1/2004 | Pawlicki et al. |
| 2004/0211837 A1 | 10/2004 | Eisenberg et al. |
| 2005/0086000 A1 * | 4/2005 | Tsuchiya .............. G08G 1/165 701/538 |
| 2005/0152581 A1 | 7/2005 | Hoki et al. |
| 2005/0278098 A1 | 12/2005 | Breed |
| 2007/0147055 A1 | 6/2007 | Komatsu |
| 2007/0221822 A1 | 9/2007 | Stein et al. |
| 2007/0253597 A1 | 11/2007 | Utida et al. |
| 2008/0043099 A1 | 2/2008 | Stein et al. |
| 2008/0112173 A1 * | 5/2008 | Dassanayake ........... B60Q 1/12 362/466 |
| 2008/0225271 A1 | 9/2008 | Ohmura |
| 2010/0253594 A1 | 10/2010 | Szczerba et al. |
| 2011/0211359 A1 * | 9/2011 | Shiao .................... B60Q 1/076 362/476 |
| 2012/0062743 A1 | 3/2012 | Lynam et al. |
| 2012/0218412 A1 | 8/2012 | Dellantoni et al. |
| 2012/0275172 A1 * | 11/2012 | Mizuno ................ B60Q 1/085 362/464 |
| 2013/0002873 A1 | 1/2013 | Hess |
| 2013/0222592 A1 | 8/2013 | Gieseke |
| 2014/0067206 A1 | 3/2014 | Pflug |
| 2014/0159925 A1 | 6/2014 | Mimeault et al. |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0288948 A1 * | 10/2015 | Schamp ............... H04N 13/025 348/47 |
| 2015/0336500 A1 * | 11/2015 | Herntrich ............... B60Q 1/085 362/466 |
| 2015/0344028 A1 | 12/2015 | Gieseke et al. |
| 2015/0352953 A1 | 12/2015 | Koravadi |
| 2016/0036917 A1 | 2/2016 | Koravadi et al. |
| 2016/0075332 A1 | 3/2016 | Edo-Ros |
| 2016/0162743 A1 | 6/2016 | Chundrlik, Jr. et al. |
| 2016/0162747 A1 | 6/2016 | Singh et al. |
| 2016/0210853 A1 | 7/2016 | Koravadi |
| 2016/0288699 A1 | 10/2016 | Solar et al. |
| 2017/0083774 A1 | 3/2017 | Solar et al. |
| 2017/0169301 A1 | 6/2017 | Kunze |

* cited by examiner

VEHICLE VISION SYSTEM WITH DETECTION ENHANCEMENT USING LIGHT CONTROL

CROSS REFERENCE TO RELATED APPLICATION

The present application claims the filing benefits of U.S. provisional application Ser. No. 62/222,268, filed Sep. 23, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Headlamp control systems are also known, such as described in U.S. Pat. Nos. 7,972,045; 7,004,606 and/or 5,796,094, which are hereby incorporated herein by reference in their entireties.

Early known head light control systems aimed to switch between the conventional high beam and low beam automatically, instead of manually by driver actuation. These early systems typically tried to determine headlights or taillights of vehicles distinct from non-vehicle light sources and reflections (such as described in U.S. Publication No. US-2007-0253597) captured by a front vehicle camera. Some known systems use specific algorithms for reflection determination (such as described in U.S. Publication No. US-2005-152581). Some known systems use color and pattern filters for detecting pairs of light (typically for determining cars and trucks), such as described in US-2008-0043099. Some utilize classifiers for determining light spots. US-2007-0221822 aimed to distinguish headlights from taillights and from streetlights and also suggests that the system's camera image classification is not just in use for head light controlling, but also for traffic sign detection, object detection and lane departure warning.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a control of one or more vehicle light sources to enhance illumination of a selected or particular area forward of the vehicle to enhance detection and classification of objects forward of the vehicle and within a projected path of travel of the vehicle.

According to an aspect of the present invention, a vision system of a vehicle includes a camera and a control. The camera is configured to be disposed at a vehicle so as to have a field of view exterior and forward of the vehicle. The control comprises an image processor operable to process image data captured by the camera. The control, responsive to processing of captured image data by the image processor, is operable to determine a path of travel of the vehicle, and responsive to processing of captured image data by the image processor, the control is operable to control an auxiliary light source of the vehicle (such as one or more individual light emitting diodes of a matrix headlight or the like of the vehicle) to enhance illumination of a target region in the determined path of travel of the vehicle and outside of the range of the vehicle's low beam headlights (or optionally outside of the range of the vehicle's high beam headlights or outside the then current range of the camera and image processor's sensing capability in the then current lighting conditions or outside of the horizontal and vertical aim of low or high beam headlights). With the control controlling or actuating the auxiliary light source, the control is operable to determine the presence of an object ahead of the vehicle and in the path of travel of the vehicle and in the target region of enhanced illumination (where the object may not have been detected prior to actuation of the auxiliary light source or may have been initially detected but not confirmed as an object of interest).

Optionally, the control may determine the target region responsive to the determined path of travel of the vehicle. For example, the control may determine the path of travel of the vehicle by detecting lane markers on the road ahead of the vehicle or by using map data, and the target region is determined to be along a determined lane marker of the road ahead of the vehicle. The control thus may control the auxiliary light source to provide enhanced illumination at an outer end of the determined lane marker outside the range of the vehicle's low beam headlights and beyond where the lane marker is determined prior to the control controlling the auxiliary light source.

Optionally, the vision system may comprise a display for displaying images captured by the camera. The vision system may generate a graphic overlay on displayed images, and the graphic overlay may be at a region of the displayed image that corresponds to the determined object. Optionally, the control may be operable to classify the determined object, and the graphic overlay may comprise a shape that corresponds to the classification of the determined object. For example, responsive to determination of a bicyclist ahead of the vehicle and in the target region, the control may classify the determined bicyclist as a bicyclist and the graphic overlay may comprise a bicycle shape.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
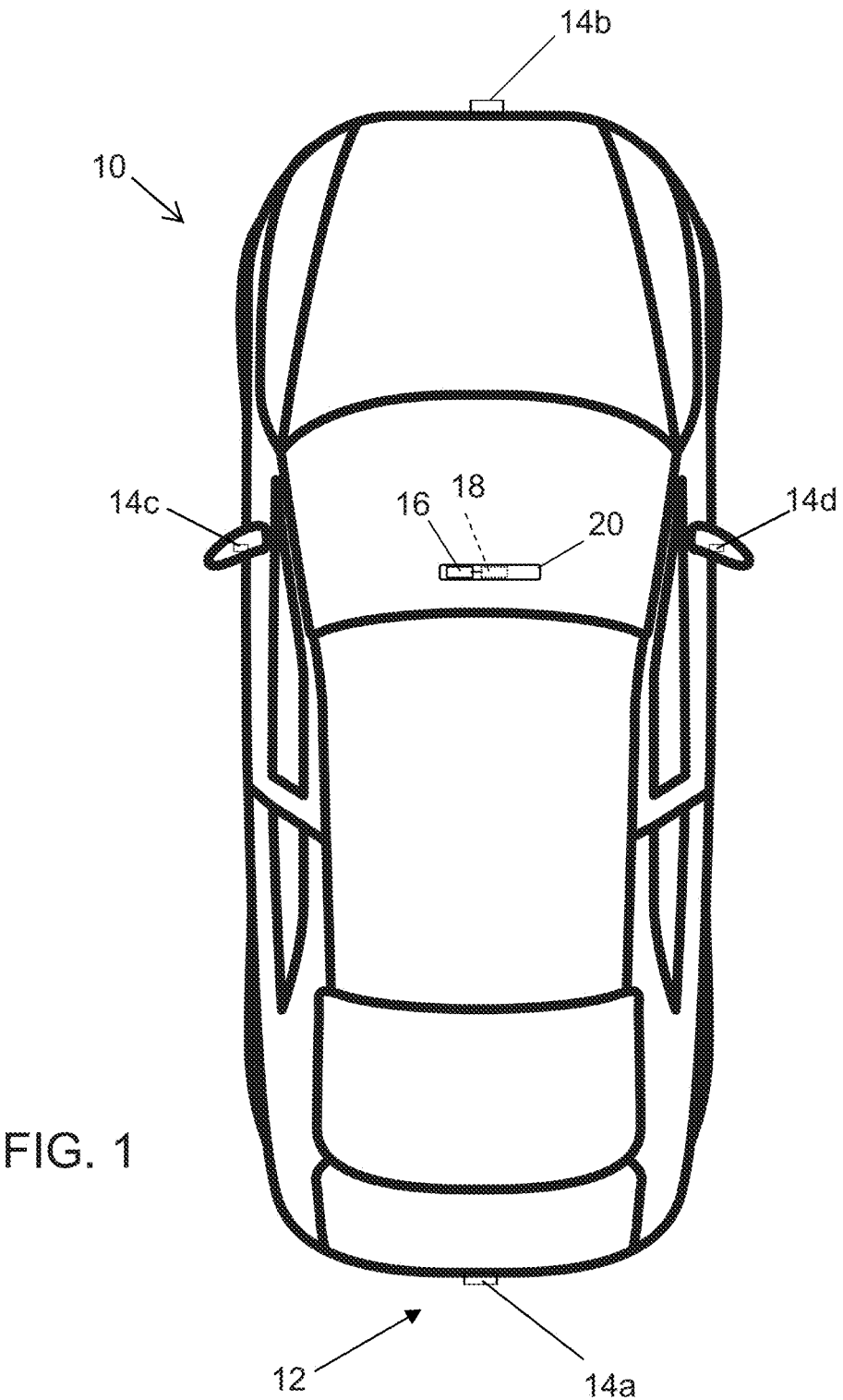
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The system of the present invention utilizes headlamp control to enhance sensing and object detection ahead of the vehicle in low lighting conditions, such as nighttime driving conditions. The system may control a light beam of one or more headlamps of a vehicle (and may control one or more light sources or light emitting diodes of an array of light sources that make up a headlamp or auxiliary light or matrix headlight of a vehicle) to direct the light beam towards an area where an object may be located, such as responsive to a detection or partial detection of an object where the system cannot confirm that an object is detected due to the low light and thus low visibility of the object. For example, if the system detects something at the outer limit or range of the camera or processor, but cannot determine if there is an object present, the system may adjust the light source to extend illumination to the area where the possible object is detected, whereby further image processing of image data captured of the illuminated area can determine if an object is present and can identify or classify the type of object.

The camera has an effective sensing range that is the range at which the camera can capture image data that is processed by the image processor to detect objects for the given light levels. With less light, the sensing range is shorter, and with more light, the sensing range is longer. Thus, the camera has a first sensing range that is the sensing range of the camera and processor when the light emitting diode(s) is not activated and has a second sensing range that is the sensing range of the camera and processor when the light emitting diode(s) is activated (with the second sensing range extending further from the vehicle than the first sensing range). The target region where the system detects objects in the distance may be outside and beyond the first sensing range of the camera (when the at least one light emitting diode is not activated) but may be within the second sensing range of the camera (when the at least one light emitting diode is activated).

The system may control the auxiliary light source or enhanced illumination light source responsive to a detection of an object or responsive to a determination of a path of travel beyond the range of the camera's sensing capability in the current lighting conditions or the system may episodically control the auxiliary light source to episodically provide enhanced illumination ahead of the vehicle and beyond the range of the vehicle's headlights (for example, the system may episodically actuate the light source in sync with the camera's capturing of image data (such as at 30 Hz or thereabouts, depending on the frame capture rate of the camera) so that the illumination is only enhanced when it can be useful to the camera and image processing). The system or control may provide such enhanced illumination only when the vehicle's headlights are in a low beam state or when the vehicle headlights are activated (in either a low beam state or high beam state) or responsive to an ambient light sensor that indicates that the ambient light is below a threshold level (such as at dusk or nighttime conditions).

In U.S. Publication No. US-2016-0162747, which is hereby incorporated herein by reference in its entirety, the night time use of light reflections or 'passive light source' or 'retro reflections' for being processed in an image processing system for road way propagation (further path prediction) is suggested. Especially the position of traffic sign poles and reflector posts is taken into account for predicting the road path beyond the area that is fully illuminated by the vehicle's headlights.

The system of the present invention uses the vehicle's auxiliary light or matrix LED headlights or direction-controllable headlights or search lights, typically called 'glare free high beam systems' or 'systems for object highlighting,' hereinafter referred to as 'matrix headlights' (MH), for extending the range and detection rate of lane- and object detection systems as well as road way propagation systems (such as by utilizing aspects of the systems described in U.S. Publication No. US-2016-0162747). The system employs a color or RGB camera and image processing system or may use a monochromatic camera and image processing system with an imager sensitive for visible light wavelengths plus some sensitivity in near infrared. The system of the present invention avoids the need, and the system costs, of having a special night vision system, typically comprising an extra near infrared illumination source and a near infrared sensitive camera or far infrared camera or support by any kind of ranging sensors (such as, for example, LIDAR, RADAR and/or Ultrasonic sensors and/or the like). Especially in night time situations where the full high beam (or all matrix LEDs) may not be switched on (or switched to full power) due to unresolved light sources (passive or active) in the field of view, possibly of approaching vehicles (so illumination has to be switched to low beam, low power or dimmed in the full view or in the partial areas of view (the initial state of the algorithm flow chart of FIG. 10 in accordance with the present invention)), the illuminated portion of the side lane or lanes may be comparably short so that the lane detection and classification system can just detect that lane's portion (in best case).

The lane detection algorithm (LDA) of the present invention may have a control output to the matrix headlights (MH) of the vehicle for controlling a light beam portion for illuminating a particular selected or predetermined area in front of the vehicle, especially within the area that is in the field of view of the image detection system. The system may interpret the already detected portion of the lane markings and may predict (propagate) the further path the lane will take. Optionally, the system may employ a road propagation algorithm for predicting the further road path (such as by utilizing aspects of the systems described in U.S. Publication No. US-2016-0162747). The system may control the matrix headlights (such as only one or more LEDs of the plurality of LEDs of the matrix headlight or headlights) to extend or enhance illumination of a particular region or target region ahead of the vehicle (see the left path of the algorithm flow chart of FIG. 10) and in the predicted path of travel of the vehicle, whereby image processing of image data captured of that extended or enhanced illumination region by the forward viewing camera provides enhanced detection and identification or classification of lane markings or objects in that region. Optionally, the objects may bear a data code (data object) visible to the camera when illuminated sufficiently (see the object pattern detection and data pattern detection path in the middle of the algorithm flow chart of FIG. 10).

Figure 2:
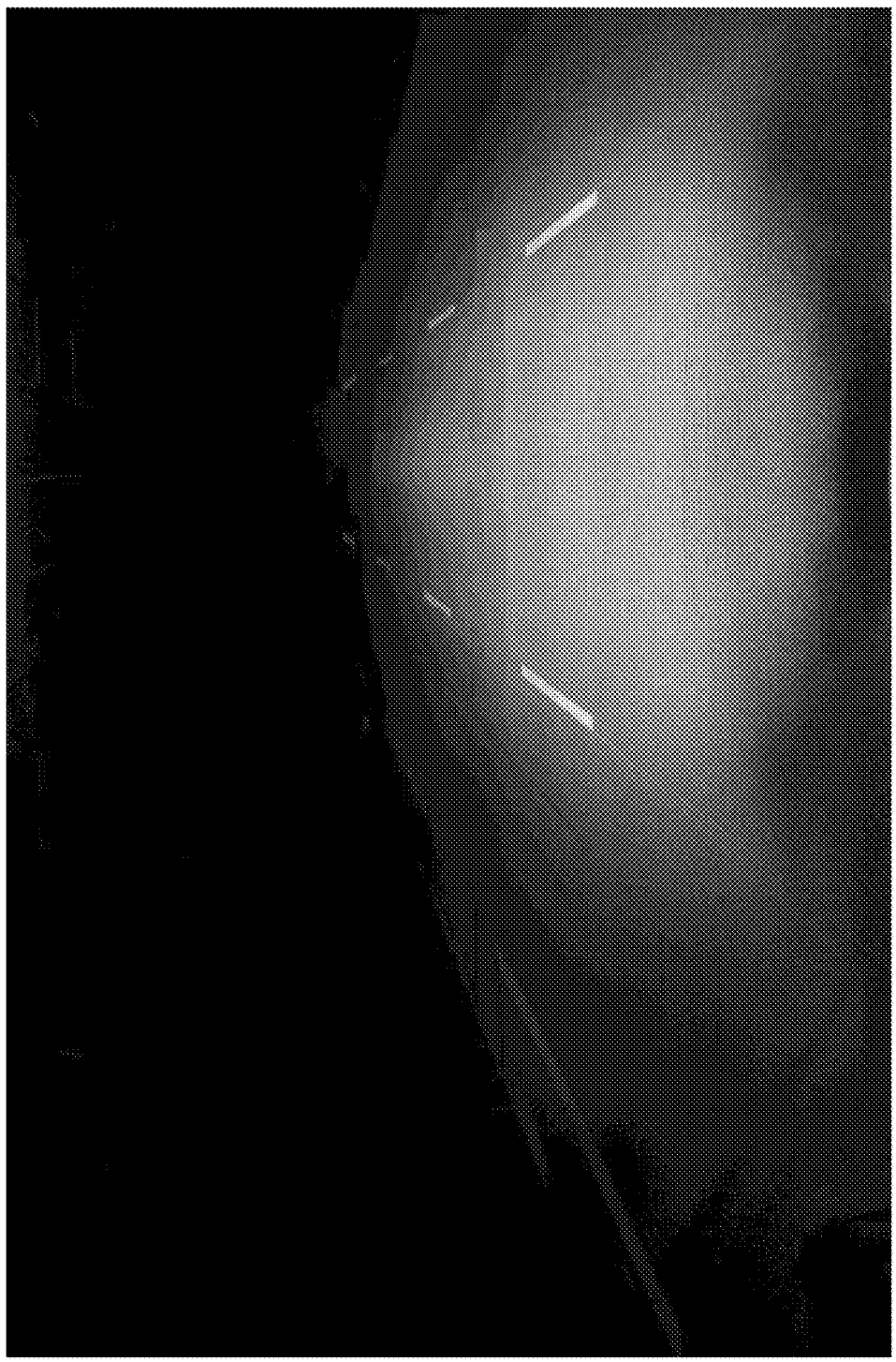
FIG. 2 is an image captured by a forward viewing camera of the system of the present invention, showing the road and lane markers ahead of the vehicle.
Figure 3:
FIG. 3 is an image similar to that of FIG. 2, shown with highlighting of the determined lane markers.
Figure 4:
FIG. 4 is an image similar to that of FIG. 2, shown with highlighting of only the determined right lane marker.
Figure 5:
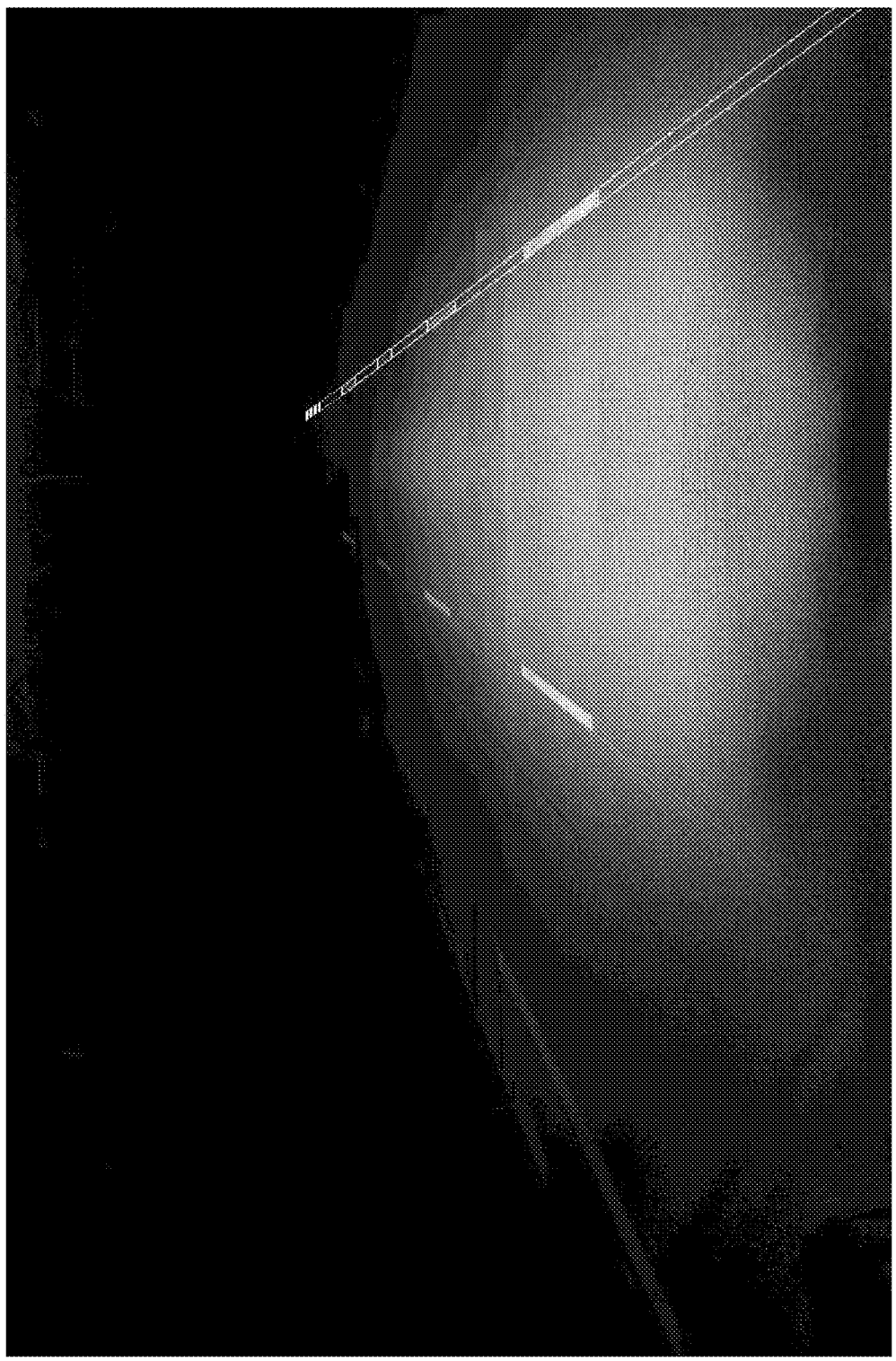
FIG. 5 is an image similar to that of FIG. 4, shown with a projected right lane marker projected by the system to predict the path of travel of the vehicle beyond the region illuminated by the vehicle's headlamps.

In an example of the system of the present invention, and such as shown in FIG. 2, a night road scene ahead of a vehicle out of the view of a driver is shown. The low beam head lights are on, but no additional MH LEDs are actuated. The lane detection system may detect the path of the left and right lane markings, such as shown in FIG. 3. The lane detection may be provided to the driver HMI (such as at a display or like viewable by the driver of the vehicle) or kept in the machine vision processing. For better clarification of the example, the right lane markers may be further processed as shown in FIG. 4 (although the system may process both right and left lane markers). The system, based at least in part on determination of lane markers ahead of the vehicle, predicts lane markers ahead of the vehicle and beyond the sensing range of the camera. In FIG. 5, the predicted propagation of the lane path is highlighted with a dotted line and a predicted position of a lane marking stripe is highlighted, such as with a striped bar (at the end).

Figure 6:
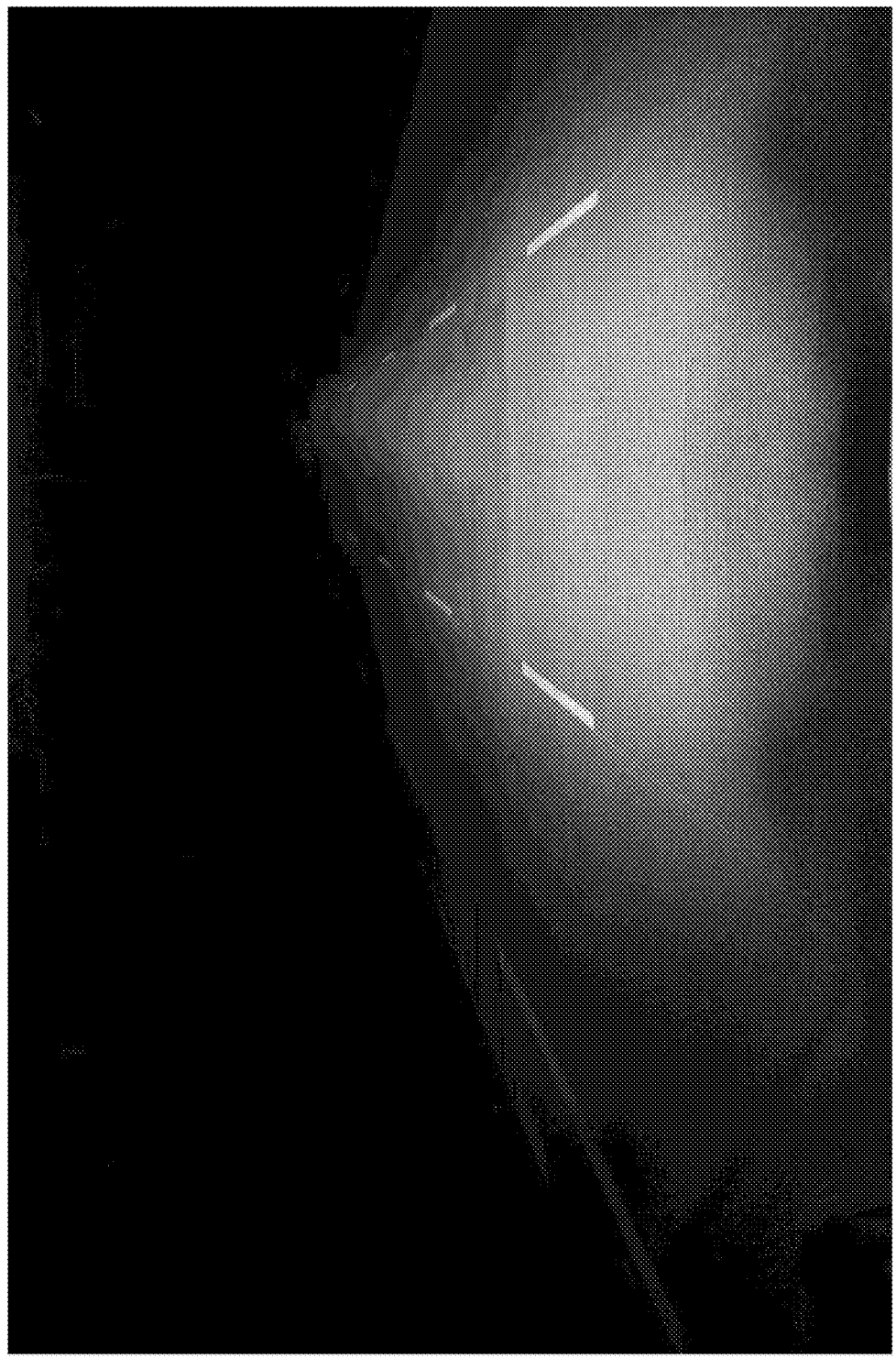
FIG. 6 is an image with the right region of the path of travel of the vehicle being further illuminated by control of one or more light sources of the vehicle, such as one or more light emitting diodes of a matrix headlight of the vehicle.
Figure 7:
FIG. 7 is an image similar to that of FIG. 6, shown with highlighting of the determined right lane marker.

Optionally, the system may add a small area of illumination of the lane course of the already detected lane portion to the illuminated borderline. Optionally, the minimal quantum that is controllable, such as one LED (or more than one LEDs, but less than all of the LEDs of the matrix array of LEDs) of the matrix headlights (MH) following the known lane course, may be additionally engaged or activated or controlled. Optionally, analog headlight systems may turn the light beam more towards the illumination borderline, or more precisely, the detection borderline of the lane. As shown in FIG. 6, in addition to the low beam, a light beam portion (such as one or more LEDs of the matrix headlights) has been switched on at the matrix headlights, and controlled by the lane propagation prediction of the system according to the present invention. Due to the extended light beam, another road marking and the cat eyes of the tires of a bicycle at the far end region of the camera's view (beyond the camera's range when the additional LED(s) was not activated) are thus brought into view and are discernible by the system and image processing (compare FIG. 6 to FIG. 5). The LDA thus may be able to detect a further distant portion at the borderline which is in continuation of the earlier detected lane portion, such as shown in FIG. 7.

Although not shown in the examples, the system of the present invention may add another area (or quantum) of the matrix headlights illumination following the course of the already detected lane, which enables the LDA to detect a further or more distant portion of the lane and so forth until the lane is detected up to the view's horizon or to the image detection system's resolution threshold or the matrix headlights' furthest possible illumination mode.

When it comes to situations where the illumination becomes more extended on the road's borderline by following its lane marking with the matrix headlight's light beam, relevant objects such as pedestrian or animals may come into the illuminated view. By that, the object detection system may be able to detect and classify these now visible objects and their position or at least an area of their location. The system of the present invention may optionally keep these objects illuminated by the matrix headlights, controlling a portion of the light beam to rest on these objects as the subject vehicle is approaching (and as the objects may move across the path or predicted path of travel of the vehicle), or optionally, the system may control the matrix headlights LED or LEDs of the light beam portion directed to the object(s) position or area in a blinking manner, such as at about a quarter Hertz in a duty cycle of about 50 percent. Optionally, the system may switch off or reduce the illumination of the light beam portion directed onto the object depending on whether the object is classified as a human, which may be a super class of pedestrian, or a horse rider, carriage, wheelchair, cyclist, rickshaw, (detected satchel as being a) student, stroller, parked vehicle with occupants in it or (any kind of) vehicle with head lights off. Optionally, the above objects classification and light control may be enhanced or accelerated or the detection distance enlarged by reading reflective or actively illuminated tags that are attached or worn by the objects that are possibly in the area of view, such as by utilizing aspects of the systems described in U.S. provisional application Ser. No. 62/330,559, filed May 2, 2016, which is hereby incorporated herein by reference in its entirety.

As an aspect of U.S. Publication No. US-2016-0162747, the detection of cyclists on hand of the moving pattern, especially its spoke reflectors, is specified. For enhancing the system of U.S. Publication No. US-2016-0162747, the algorithm of the present invention may control a light beam portion of the matrix headlights in a way so that just the cyclist tire portion is illuminated (once the cyclist is detected as potentially being a cyclist or other object of interest to the driver of the vehicle), while the upper portion may stay dimmed so as to not dazzle or glare or blind the cyclist, but while tracking the cyclist's position. Optionally, further specific objects may be just partially illuminated when detected as such (object) and classified, such as, for example, horse riders, or other types as discussed above. The system thus may emit light only at a targeted area or portion of the detected object to provide enhanced illumination of the object and enhanced detection and classification of the object, while not fully illuminating the object so that the person or animal may not be blinded or bothered by the enhanced illumination.

Figure 8:
FIG. 8 is an image similar to that of FIG. 7, shown with a box at or partially around the displayed image of a detected bicyclist ahead of and in the path of travel of the vehicle.
Figure 10:
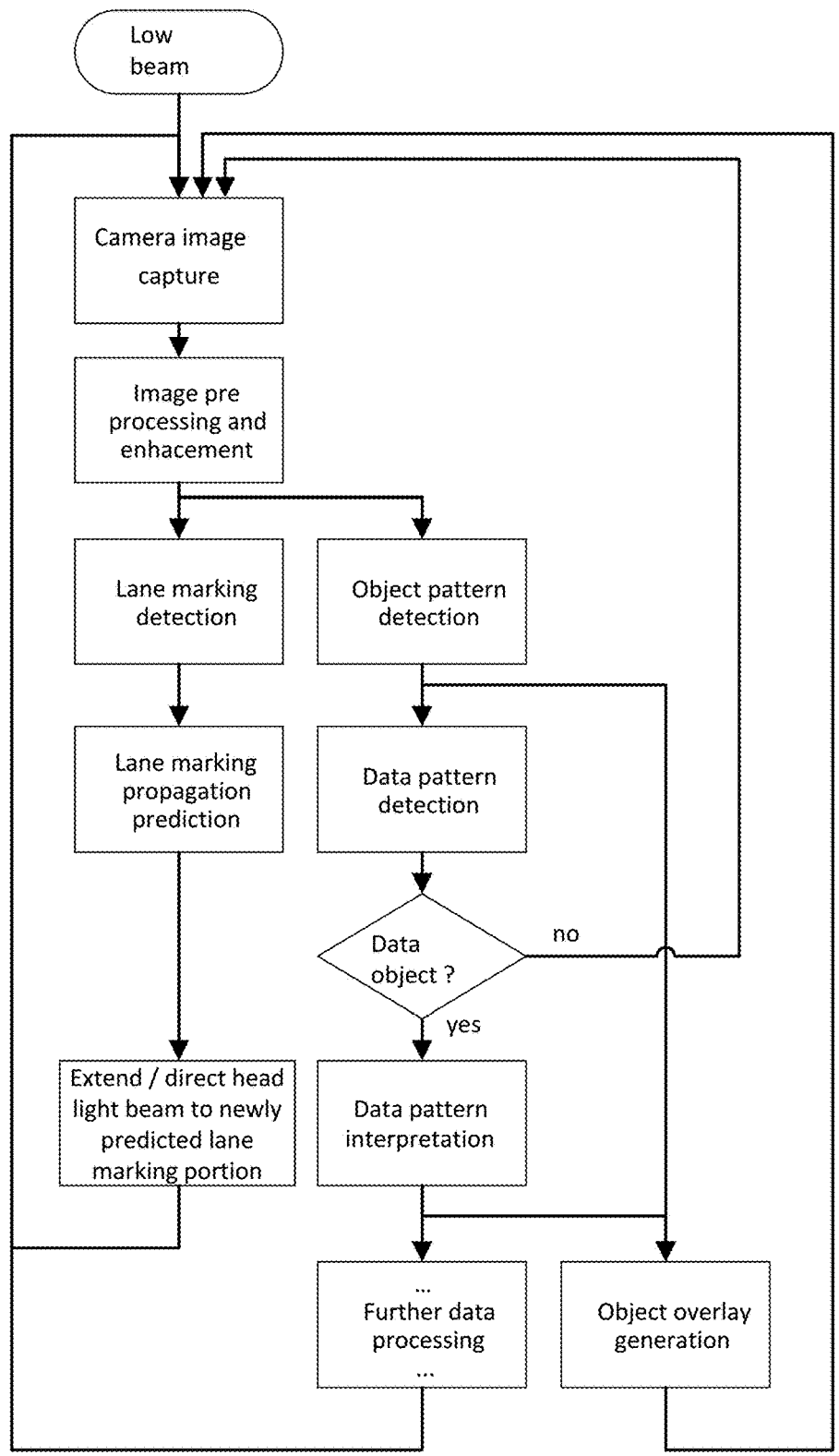
FIG. 10 is a flow chart of an algorithm of the present invention.

Optionally, every detected object may be highlighted with an overlay at a display screen that displays images captured by the camera, such as a full windscreen head up display (see the right path (no data object) of the algorithm flow chart of FIG. 10). For example, the system may generate or augment boxes around the objects to highlight the objects at the display. Optionally, the system of the present invention may draw or generate boxes around the extension of detected objects that may not be fully visible any more since the illumination was dimmed. For example, the bounding box may extend around a detected cyclist's full extension even when the cyclist's upper portion is not visible, since (after identification or classification as being a cyclist) the matrix headlight's illumination was dimmed or controlled or adjusted to reduce glaring or blinding the cyclist. In the example shown in FIG. 8, a bounding box windshield overlay around a detected cyclist (since the moving pattern of its tire cat eyes was classified as most probable being a cycle's tires in motion, so a cyclist) is placed (tracking the cyclist's motion).

Figure 9:
FIG. 9 is an image similar to that of FIG. 7, shown with a bicycle and cyclist shaped overlay at or partially around the displayed image of a detected bicyclist ahead of and in the path of travel of the vehicle.

Optionally, the overlays may show the object stylized in a way that it comes close to the source object it is overlaid onto, instead of just a bounding box. For example, when an object is classified as a horse with rider, the overlay shows a horse with rider. For example, when the object is classified as a cyclist, the overlay used is a bicycle with a rider on it, such as shown in the example of FIG. 9). Optionally, the chosen overlay may not fully specifically fit to the originating object. It may be chosen as best fitting as possible. For example, a moose, reindeer, elk, deer, wapiti or antelope or the like may all be overlaid with a deer-shaped overlay even though the zoological species may not fit accurately. Optionally, the object may bear a data pattern readable by the system of the present invention giving indication or clearly stating how the object is to be classified for optionally choosing the correct overlay and for taking appropriate measures in accordance with the objects class (see the middle path (data object—yes) of the algorithm flow chart of FIG. 10). For example, preparing a careful passing when approaching a pupil or student walking on the roadside wearing a satchel equipped with a signaling pattern or, for example, a QR code data tag, with the data tag code identifying or classifying the satchel-wearing 'object' as a pupil/student enabled by increasing or extending the MH's beam along the roadside's lane marking until the satchel's signal pattern or tag is sufficiently enlightened or illuminated.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/

0222593; 2013/0300869; 2013/0278769; 2013/0258077; 2013/0258077; 2013/0242099; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera configured to be disposed at a vehicle so as to have a field of view exterior and forward of the vehicle;
   a control comprising an image processor operable to process image data captured by said camera;
   wherein said control, responsive to processing of captured image data by said image processor, is operable to determine lane markers ahead of the vehicle and in a path of travel of the vehicle and in a first effective sensing range of said camera that is based on illumination present ahead of the vehicle and in a path of travel of the vehicle;
   wherein, responsive to determination of lane markers ahead of the vehicle via processing of captured image data by said image processor, said control is operable to predict lane markers ahead of the vehicle that are outside and beyond the first effective sensing range of said camera;
   wherein the first effective sensing range encompasses a first region illuminated by at least one light emitting diode of a matrix of light emitting diodes of said vision system, and wherein the matrix of light emitting diodes are part of an exterior light of the vehicle;
   wherein, responsive to processing of captured image data by said image processor, said control is operable to control said matrix of light emitting diodes, and wherein, responsive to prediction of lane markers ahead of the vehicle that are outside and beyond the first effective sensing range of said camera, and responsive to detection of an object present at least partially outside of the first effective sensing range of said camera, said control controls at least one other light emitting diode of said matrix of light emitting diodes to enhance illumination at a target region that encompasses where lane markers outside and beyond the first effective sensing range are predicted to be;
   wherein said camera has the first effective sensing range when said at least one light emitting diode is activated and said at least one other light emitting diode is not activated and has a second effective sensing range when said at least one light emitting diode and said at least one other light emitting diode are activated, and wherein the second effective sensing range extends further from the vehicle than the first effective sensing range;
   wherein the target region is outside and beyond the first effective sensing range of said camera when said at least one other light emitting diode is not activated but is within the second effective sensing range of said camera when said at least one other light emitting diode is activated; and
   wherein, responsive to processing of captured image data by said image processor with said at least one other light emitting diode activated, said control is operable to confirm the presence of the object at the target region and within the second effective sensing range.

2. The vision system of claim 1, wherein said control is operable to control one or more others of the individual light emitting diodes to enhance the illumination of a selected portion of the target region.

3. The vision system of claim 1, wherein said control controls said at least one other light emitting diode to provide enhanced illumination at an outer region of the determined lane markers outside the range of low beam headlights of the vehicle and beyond where the lane markers are determined prior to said control controlling said at least one other light emitting diode.

4. The vision system of claim 1, comprising a display for displaying images derived from image data captured by said camera.

5. The vision system of claim 4, wherein said vision system is operable to generate a graphic overlay that is overlaid on displayed images, and wherein the graphic overlay is overlaid at a region of the displayed image that corresponds to the detected object.

6. The vision system of claim 5, wherein, responsive to processing of captured image data by said image processor with said at least one other light emitting diode controlled to enhance illumination at the target region, said control is operable to classify the detected object, and wherein the graphic overlay comprises a shape that corresponds to the classification of the detected object.

7. The vision system of claim 5, wherein, responsive to determination, via processing of captured image data by said image processor with said at least one other light emitting diode controlled to enhance illumination at the target region, of a moving pattern indicative of a bicycle's tires in motion ahead of the vehicle and in the target region, said control is operable to classify the determined moving pattern as a bicycle, and wherein the graphic overlay comprises a bicycle shape.

8. The vision system of claim 1, wherein, responsive to processing of captured image data by said image processor, said control is operable to control said matrix of light emitting diodes to enhance illumination of the target region in the determined path of travel of the vehicle and outside of illumination provided by low beam headlights of the vehicle.

9. The vision system of claim 1, wherein, responsive to processing of captured image data by said image processor, said control is operable to control said matrix of light emitting diodes to enhance illumination of the target region in the determined path of travel of the vehicle and outside of illumination provided by high beam headlights of the vehicle.

10. The vision system of claim 1, wherein said control is operable to control said matrix of light emitting diodes to enhance illumination of the target region in the determined path of travel of the vehicle responsive to determination of ambient light being below a threshold level.

11. The vision system of claim 1, wherein said matrix of light emitting diodes comprises a matrix headlight of the vehicle.

12. A vision system for a vehicle, said vision system comprising:
a camera configured to be disposed at a vehicle so as to have a field of view exterior and forward of the vehicle;
a display for displaying images derived from image data captured by said camera;
a control comprising an image processor operable to process image data captured by said camera;
wherein said control, responsive to processing of captured image data by said image processor, is operable to determine lane markers ahead of the vehicle and in a path of travel of the vehicle and in a first effective sensing range of said camera that is based on illumination present ahead of the vehicle and in a path of travel of the vehicle;
wherein, responsive to determination of lane markers ahead of the vehicle via processing of captured image data by said image processor, said control is operable to predict lane markers ahead of the vehicle that are outside and beyond the first effective sensing range of said camera;
wherein the first effective sensing range encompasses a first region illuminated by at least one light emitting diode of a matrix headlight of the vehicle, said matrix headlight comprising a matrix of light emitting diodes;
wherein, responsive to processing of captured image data by said image processor, said control is operable to control said matrix headlight of the vehicle, and wherein, responsive to prediction of lane markers ahead of the vehicle that are outside and beyond the first effective sensing range of said camera, and responsive to detection of an object present at least partially outside of the first effective sensing range of said camera, said control controls at least one light emitting diode of said matrix of light emitting diodes to enhance illumination at a target region that encompasses where lane markers outside and beyond the first effective sensing range are predicted to be;
wherein said camera has the first effective sensing range when said at least one light emitting diode is activated and said at least one other light emitting diode is not activated and has a second effective sensing range when said at least one light emitting diode is activated and said at least one other light emitting diode are activated, and wherein the second effective sensing range extends further from the vehicle than the first effective sensing range;
wherein the target region is outside and beyond the first effective sensing range of said camera when said at least one other light emitting diode is not activated but is within the second effective sensing range of said camera when said at least one other light emitting diode is activated;
wherein, responsive to processing of captured image data by said image processor with said at least one other light emitting diode activated, said control is operable to confirm the presence of the object at the target region and within the second effective sensing range; and
wherein said vision system is operable to generate a graphic overlay that is overlaid on displayed images, and wherein the graphic overlay is overlaid at a region of the displayed image that corresponds to the detected object.

13. The vision system of claim 12, wherein said control is operable to control one or more of the individual light emitting diodes to enhance the illumination of a selected portion of the target region.

14. The vision system of claim 12, wherein, responsive to processing of captured image data by said image processor with said at least one other light emitting diode controlled to enhance illumination at the target region, said control is operable to classify the detected object, and wherein the graphic overlay comprises a shape that corresponds to the classification of the detected object.

15. The vision system of claim 12, wherein, responsive to determination, via processing of captured image data by said image processor with said at least one other light emitting diode controlled to enhance illumination at the target region, of a moving pattern indicative of a bicycle's tires in motion ahead of the vehicle and in the target region, said control is operable to classify the determined moving pattern as a bicycle, and wherein the graphic overlay comprises a bicycle shape.

16. A vision system for a vehicle, said vision system comprising:
   a camera configured to be disposed at a vehicle so as to have a field of view exterior and forward of the vehicle;
   a control comprising an image processor operable to process image data captured by said camera;
   wherein said control, responsive to processing of captured image data by said image processor, is operable to determine lane markers ahead of the vehicle and in a path of travel of the vehicle and in a first effective sensing range of said camera that is based on illumination present ahead of the vehicle and in a path of travel of the vehicle;
   wherein, responsive to determination of lane markers ahead of the vehicle via processing of captured image data by said image processor, said control is operable to predict lane markers ahead of the vehicle that are outside and beyond the first effective sensing range of said camera;
   wherein the first effective sensing range encompasses a first region illuminated by at least one light emitting diode of a matrix headlight of the vehicle, said matrix headlight comprising a matrix of light emitting diodes;
   wherein, responsive to processing of captured image data by said image processor, said control is operable to control said matrix headlight of the vehicle, and wherein, responsive to prediction of lane markers ahead of the vehicle that are outside and beyond the first effective sensing range of said camera, and responsive to detection of an object present at least partially outside of the first effective sensing range of said camera, said control controls at least one light emitting diode of said matrix of light emitting diodes to enhance illumination at a target region that encompasses where lane markers outside and beyond the first effective sensing range are predicted to be;
   wherein said camera has the first effective sensing range when said at least one light emitting diode is activated and said at least one other light emitting diode is not activated and has a second effective sensing range when said at least one light emitting diode and said at least one other light emitting diode are activated, and wherein the second effective sensing range extends further from the vehicle than the first effective sensing range;
   wherein the target region is outside and beyond the first effective sensing range of said camera when said at least one other light emitting diode is not activated but is within the second effective sensing range of said camera when said at least one other light emitting diode is activated;
   wherein, responsive to processing of captured image data by said image processor with said at least one light emitting diode activated, said control is operable to confirm the presence of the object at the target region and within the second effective sensing range; and
   wherein said control is operable to control said matrix of light emitting diodes to enhance illumination of the target region in the determined path of travel of the vehicle responsive to determination of ambient light being below a threshold level.

17. The vision system of claim 16, comprising a display for displaying images derived from image data captured by said camera, and wherein said vision system is operable to generate a graphic overlay that is overlaid on displayed images, and wherein the graphic overlay is overlaid at a region of the displayed image that corresponds to the detected object, and wherein, responsive to processing of captured image data by said image processor with said at least one light emitting diode controlled to enhance illumination at the target region, said control is operable to classify the detected object, and wherein the graphic overlay comprises a shape that corresponds to the classification of the detected object.

18. The vision system of claim 16, comprising a display for displaying images derived from image data captured by said camera, and wherein said vision system is operable to generate a graphic overlay that is overlaid on displayed images, and wherein the graphic overlay is overlaid at a region of the displayed image that corresponds to the detected object, and wherein, responsive to determination, via processing of captured image data by said image processor with said at least one light emitting diode controlled to enhance illumination at the target region, of a moving pattern indicative of a bicycle's tires in motion ahead of the vehicle and in the target region, said control is operable to classify the determined moving pattern as a bicycle, and wherein the graphic overlay comprises a bicycle shape.

19. The vision system of claim 16, wherein, responsive to processing of captured image data by said image processor, said control is operable to control said matrix of light emitting diodes to enhance illumination of the target region in the determined path of travel of the vehicle and outside of illumination provided by low beam headlights of the vehicle.

20. The vision system of claim 16, wherein, responsive to processing of captured image data by said image processor, said control is operable to control said matrix of light emitting diodes to enhance illumination of the target region in the determined path of travel of the vehicle and outside of illumination provided by high beam headlights of the vehicle.

* * * * *